United States Patent [19]

Nagano et al.

[11] Patent Number: 4,910,589
[45] Date of Patent: Mar. 20, 1990

[54] METHOD OF CONVERTING LIGHT DATA TO COLOR DATA WITH USE OF MATRIX COEFFICIENTS

[75] Inventors: Fumikazu Nagano; Masanori Morigami, both of Yamatokoriyama, Japan

[73] Assignee: Sharp Kabushiki Kaisha, Osaka, Japan

[21] Appl. No.: 191,873

[22] Filed: May 9, 1988

[30] Foreign Application Priority Data

May 9, 1987 [JP] Japan .................. 62-113256

[51] Int. Cl.4 .......................... H04N 1/40
[52] U.S. Cl. ......................... 358/80; 358/75
[58] Field of Search ................... 358/80, 75

[56] References Cited

U.S. PATENT DOCUMENTS

| | | | |
|---|---|---|---|
| 2,790,844 | 4/1957 | Neugebauer | 358/80 |
| 2,799,722 | 7/1957 | Neugebauer | 358/80 |
| 4,307,962 | 12/1981 | Jung | 358/80 X |
| 4,458,265 | 7/1984 | Yoshida et al. | 358/80 |
| 4,643,563 | 2/1987 | Sayanagi | 358/80 X |
| 4,683,492 | 7/1987 | Sugiura et al. | 358/80 |

Primary Examiner—James J. Groody
Assistant Examiner—Mark R. Powell
Attorney, Agent, or Firm—Birch, Stewart, Kolasch & Birch

[57] ABSTRACT

A color converting method in a color image reading apparatus operable to read image information by optically scanning a color transcript, which method comprises the steps of dividing a color space determined by light data of R, G and B into n areas, at the time light data of R, G and B obtained from light reflected from the color transcript are converted into Y (yellow), M (magenta) and C (cyan) data, which are color data for an ink, by the use of matrix coefficients; and converting the light data into color data with the use of matrix coefficients obtained by an approximate equation fixed for each area.

5 Claims, 2 Drawing Sheets

METHOD OF CONVERTING LIGHT DATA TO COLOR DATA WITH USE OF MATRIX COEFFICIENTS

BACKGROUND OF THE INVENTION

1. Field of the Invention

The present invention generally relates to a color converting method and, more particularly, to the color converting method performed by a color reading apparatus for converting red (R), green (G) and blue (B) color data, which are light data, into yellow (Y), magenta (M) and cyan (C) color data utilizable for the preparation of an ink.

2. Description of the Prior Art

A color light can be expressed by a combination of respective values of R, G and B. FIG. 4 illustrates a diagram in which those values of R, G and B are depicted in a three-dimensional representation.

Referring to FIG. 4, the color C(C) is represented by one point lying in the system of rectangular coordinates defined by R, G and B, the coordinate of which is (R, G, B). This can be considered a vector of R, G and B components.

The length of the vector in this three-dimensional representation describes the brightness of the color light and is converted with a change in color. In other words, a change in color means only a change in the direction of the vector.

FIG. 5 is a diagram used to explain the system of coordinates descriptive of the chromaticity of the color light. The origin represented by R=G=B=0 is the point at which the energy of the color light is zero and, thus, the brightness is zero.

Since the white color Cw(W), which is taken as a reference, is expressed by R=G=B, the vector thereof extends outwardly from a plane (unitary plane). It forms a part of the equilateral triangle having its vertices lying at respective coordinates (1, 0, 0), (0, 1, 0) and (0, 0, 1) as shown in FIG. 5.

Since, as hereinbefore described, the difference in color in the three-dimensional representation is the difference in direction of the vector, and if only the color is taken into consideration, the color C can be expressed by the point of intersection in the system of coordinates between the planes of the equilateral triangle and the color vector. If the coordinates of this point of intersection are expressed by (r, g, b), the equation of the color in that point will be as follows.

$$c(C) = r(R) + g(G) + b(B) \qquad (1)$$

And, $$r = R/\Sigma, \; g = G/\Sigma, \; b = B/\Sigma$$

wherein $\Sigma$ represents a certain constant.

The equation which gives a point (x, y, z) on the plane can be expressed as follows, if respective points at which the plane intersect the x-, y- and z-axes are expressed by a, b and c.

$$x/a + y/b + z/c = 1$$

Therefore, in the unitary plane shown in FIG. 5, $a = b = c = 1$, or $$r + g + b = 1 \qquad (2)$$

This occurs if x, y and z are rewritten as r, g and b, respectively. Since the equation (2) can be rewritten to read;

$$R/\Sigma + G/\Sigma + B/\Sigma = 1, \qquad (3)$$

then, $$\Sigma = R + G + B.$$

Therefore;

$$r = R/(R+G+B), \; g = G/(R+G+B),$$
$$b = B/(R+G+B)$$

Hereinafter, the relationship between the light R, G and B and the pigments Y, M and C will be discussed.

As is the case with the light R, G and B, the pigments Y, M and C can also be expressed in a three-dimensional representation. Considering the possibility in which arbitrarily chosen points in the system of R, G and B coordinates in a color space are converted into a system of Y, M and C coordinates, the relationship between Y, M and C and R, G and B can be expressed as follows.

$$\begin{bmatrix} Y \\ M \\ C \end{bmatrix} = \begin{bmatrix} a11 & a12 & a13 \\ a21 & a22 & a23 \\ a31 & a32 & a33 \end{bmatrix} \begin{bmatrix} R \\ G \\ B \end{bmatrix}$$

Assuming that $$\begin{bmatrix} a11 & a12 & a13 \\ a21 & a22 & a23 \\ a31 & a32 & a33 \end{bmatrix}$$

is expressed by A, $$\begin{bmatrix} Y \\ M \\ C \end{bmatrix} = A \begin{bmatrix} R \\ G \\ B \end{bmatrix} \qquad (4)$$

However, as shown in FIG. 3, Y and B, M and G, and C and R are chromaticitically opposite to each other. In other words, if $r + g + b = 1$ represents a white color in the case of the light, $y + m + c = -1$ represents a black color in the case of the pigment.

Referring to FIG. 3, it can be understood that the light R+G of $r \cdot \frac{1}{2} + g \cdot \frac{1}{2}$ in chromaticity is necessary in order for the pigment Y to give a chromaticity of $-y \cdot \frac{1}{2}$ In other words, the light having a chromaticity corresponding to the chromaticity of Y is R+G.

In view of the foregoing, if the terms of B, G and R corresponding to Y, M and C in the equation (4) are rendered to be (R+G), (R+B) and (G+B), respectively, the value of a matrix coefficient A can be reduced. Further, the color conversion from the light R, G and B into the pigments Y, M and C, respectively, can be accurately achieved. Therefor, rewriting the equation (4) results in:

$$\begin{bmatrix} Y \\ M \\ C \end{bmatrix} = A' \begin{bmatrix} (R+G) \\ (R+B) \\ (B+G) \end{bmatrix}$$

and, in view of $R+G+B=1$, $$\begin{bmatrix} Y \\ M \\ C \end{bmatrix} = A' \begin{bmatrix} (1-B) \\ (1-G) \\ (1-R) \end{bmatrix}$$

According to the prior art color reading apparatus, the total color conversion has been carried out by the use of the same A' (matrix coefficient).

However, it has been found that the total color conversion with the use of the same matrix coefficient often results in uneven color reproduction, some exhibiting a good color reproducibility while others do not.

SUMMARY OF THE INVENTION

Accordingly, the present invention has been devised with a view to substantially eliminate the above described problems and has, as an object, providing a color converting method wherein a total color space is equally divided into an arbitrarily chosen number with respect to an achromatic point and the use is made of a matrix formula effective to achieve an accurate color conversion for each color space.

Correspondingly, the color converting method according to the present invention is featured in that the color space determined by light data of R, G and B is divided into n areas; an approximate equation is fixed for the determination of a matrix coefficient for each area; and the color conversion from the light data of R, G and B into color data of Y, M and C is carried out by the use of an appropriate one of the matrix coefficients.

With the method according to the present invention, the color conversion from the light data of R, G and B into the color data of Y, M and C can be accomplished by the use of the matrix coefficients which are appropriate to the position of the color space.

BRIEF DESCRIPTION OF THE DRAWINGS

This and other objects and features of the present invention will become clear from the following description taken in conjunction with a preferred embodiment thereof with reference to the accompanying drawings, in which.

DETAILED DESCRIPTION OF THE EMBODIMENT

Figure 1:
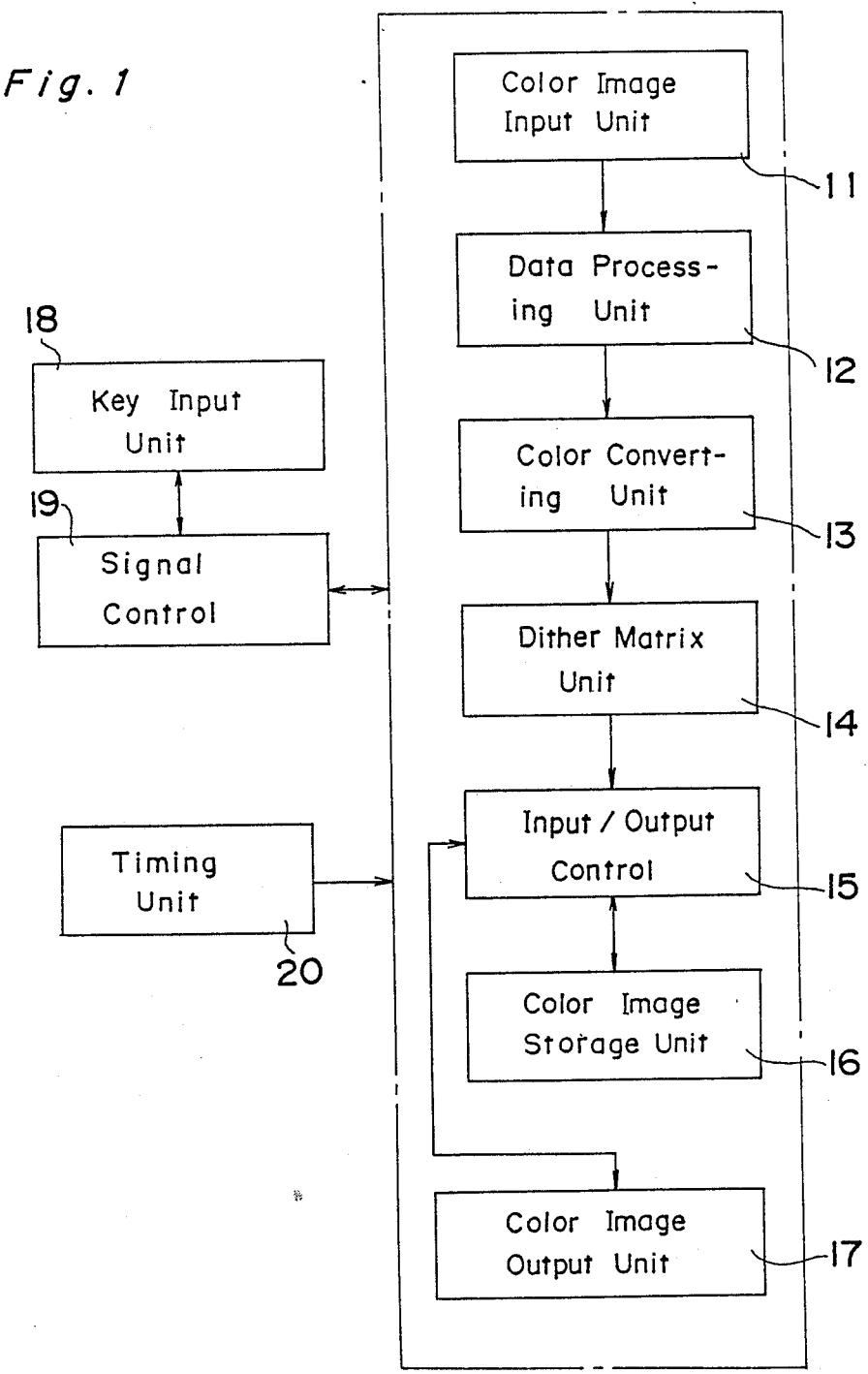
FIG. 1 is a block diagram showing a color image reading apparatus which is capable of executing a color converting method of the present invention.
Figure 4:
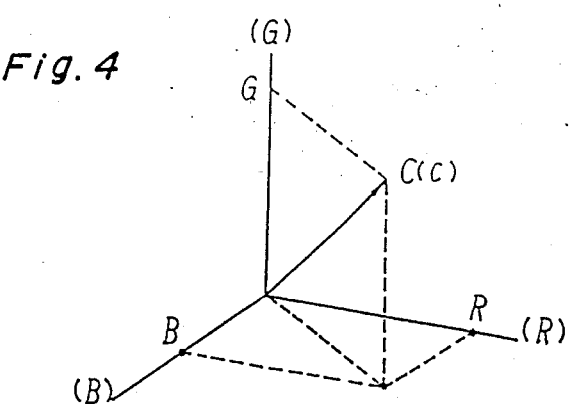
FIGS. 4 and 5 is a diagram showing light data shown in a three-dimensional representation with data of these primary colors R, G and B.

Referring now to FIG. 1, there is shown a color reading apparatus which performs a color converting method of the present invention. In FIG. 1, reference numeral 11 represents a color image input unit operable to reduce a color image transcript into three primary colors of R, G and B. This color image imput unit 11 may be so designed that rays of color light alternately emitted from red, green and blue fluorescent lamps and subsequently reflected can be received through an optical system by a CCD line sensor. The sensor in turn converts the light into amplified electric signals.

Reference numeral 12 represents an input data processing unit for correcting an output from the color image input unit 11 and effecting an analog-to-digital conversion to provide a digital signal for each picture element. Reference numeral 13 represents a color converting unit for converting light signals R, G and B into pigment signals Y, M and C, the details of which will be described later since the present invention is designed around this color converting method. Reference numeral 14 represents a dither matrix unit for converting data for each picture element, supplied from the color converting unit 13, into bit data for printout according to a dither method. Reference numeral 16 represents an image storage unit for storing an output from the dither matrix unit 14 through an image storage input and output control 15.

Reference numeral 17 represents a color image output unit for outputting image data. Reference numeral 18 represents a key input unit for inputting various instructions. Reference numeral 19 represents a signal control for controlling the apparatus as a whole in dependence upon an input from the key input unit 18. Reference numeral 20 represents a timing unit for synchronizing the apparatus as a whole.

The color converting method executed in the color converting unit 13 will now be described.

At the outset, for the purpose of simplification of calculation, the system of three-dimensional color space R, G and B coordinates described hereinabove is converted into a system of two-dimensional RG coordinates. In other words, the insertion of the equation (3) into the equation (2) will result in:

$$r=R/(R+G+B), g=G/(R+G+B), b=1-r-g.$$

Figure 2:
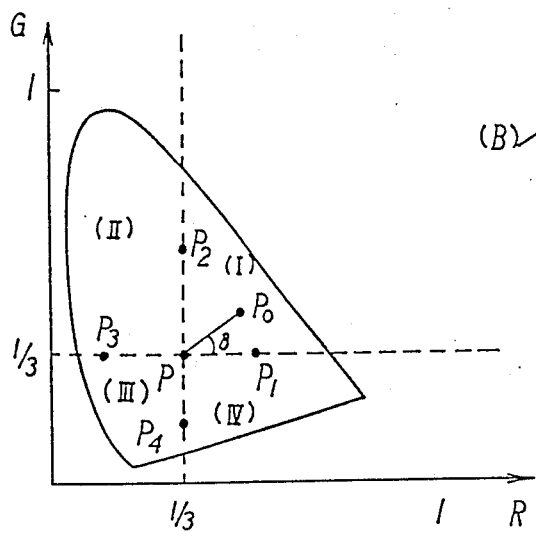
FIG. 2 is a diagram showing a system of RG coordinates.
Figure 5:
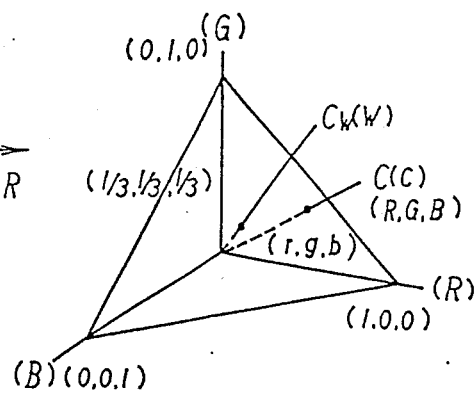
Figure 3:
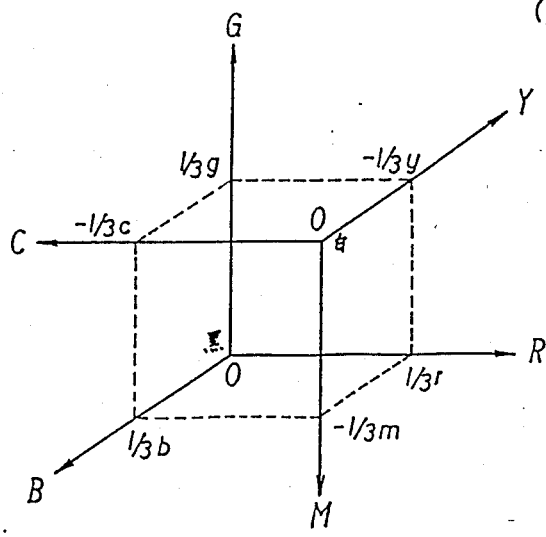
FIG. 3 is a diagram showing the relativity of chromaticity between R, G and B data and Y, M and C data.

By this conversion, the total color space can be expressed in terms of an R, G space such as shown in FIG. 2.

Referring to FIG. 2, a point P represents the achromatic point and, since $r+g+b$ is equal to 1, $r=\frac{1}{3}$ and $g=\frac{1}{3}$.

With this point P taken as a center, the color space is divided into four equal areas (I), (II), (III) and (IV), and a representative point at the boundary between these areas is expressed by P1, P2, P3 and P4, respectively. Then, with respect to the representative points P1, P2, P3 and P4, matrix coefficients A1, A2, A3 and A4 for a conversion equation are determined. It is, however, to be noted that the matrix coefficients can be experimentally determined on trial and error basis.

Using an equation for the system of polar coordinates, a matrix coefficient for each point which is varied by an angle (for each area on the basis of the matrix coefficients A1, A2, A3 and A4 of the representative points P1, P2, P3 and P4) are determined.

In other words, the matrix coefficient $A(I)(\theta)$ at the color space (I) in which the angle $\theta$ is variable based on the matrix coefficients A1, A2, A3 and A4 can be expressed as follows:

$$A(I)(\theta)=[(\theta) \cdot (A2-A1)/(\pi/2)]+A1.$$

Similarly, the matrix coefficients A(II)(θ), A(III)(θ) and A(IV)(θ) for the color spaces (II), (III) and (IV), respectively, can be expressed as follows:

$$A(II)(\theta) = [(\theta - \pi/2) \cdot (A3 - A2)/(\pi/2)] + A2$$

$$A(III)(\theta) = [(\theta - \pi) \cdot (A4 - A3)/(\pi/2)] + A3$$

$$A(IV)(\theta) = [(\theta - 3\pi/2) \cdot (A1 - A2)/(\pi/2)] + A4.$$

Thus, the matrix coefficient for each color can be determined by the approximate equation of the polar coordinate system.

Then, by inserting the matrix coefficient so determined into the color conversion equation (5) for converting the light R, G and B into the pigments Y, M and C,) the color conversion is complete.

It is to be noted that, although in the embodiment shown and described the color space has been described as divided into the four equal areas, the present invention is not always limited to such an example. The greater the number of the divided areas, the more favorable the color conversion.

As hereinbefore described, with the color converting method according to the present invention in which the matrix coefficients appropriate for the colors denoted in the color space are determined for the color conversion, a color conversion having a highly favorable color reproducibility for all of colors can be accomplished. Also, since the matrix coefficient may have a value which contains a continuity at the boundary between the areas, there is no possibility that a color may jump in an output picture.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method for determining pigmentation for use in reproduction of a color image in a color image reading apparatus comprising the steps of:
    scanning a color image with at least one sensor in order to provide color image data;
    processing said color image data and providing primary color light data signals R, G, and B based upon said color image data;
    color converting said light data signals R, G, and B into pigment signals Y, M and C, said color converting including the steps of,
        converting a three-dimensional color space consisting of primary color light R, G, and B coordinates into a two-dimensional color space consisting of two of said primary color lights R, G, and B;
        dividing said two-dimensional color space into n areas;
        defining a matrix coefficient for each n area in terms of a polar coordinate conversion equation which describes any given point of said two-dimensional color space;
        inserting one of said defined matrix coefficients into a color conversion equation stored in a memory, said one of said defined matrix coefficients corresponding to the n area of said two-dimensional color space wherein a given point is located; and
        converting said light data signals R, G, and B into said pigment signals Y, M, and C through the use of said stored color conversion equation corresponding to the one of said defined matrix coefficients, thereby determining pigmentation for reproduction of the color image.

2. The color converting method of claim 1 wherein the n areas of said two-dimensional color space are divided with respect to an achromatic point.

3. The color converting method of claim 2 wherein said two-dimensional color space consists of R and G coordinates.

4. A method for determining pigmentation for use in reproduction of a color image in a color image reading apparatus comprising the steps of:
    scanning said color image with at least one sensor to provide color image data including primary color light data R, G, and B for each image point thereof;
    mapping said color light data onto a two-dimensional color space in a memory to obtain two-dimensional color data;
    dividing said two-dimensional color space into N areas;
    converting said two-dimensional color data into pigment data Y, M, and C by,
        determining which respective N area said two-dimensional color data is located; and
        converting said two-dimensional color data into pigment data Y, M, and C through the use of a polar coordinate conversion equation corresponding to the respective N area, thereby determining pigmentation for reproduction of the color image.

5. The color converting method of claim 4, wherein said step of converting said two-dimensional color data further includes:
    defining a matrix coefficient for said determined N area in terms of said polar coordinate conversion equation;
    inserting said defined matrix coefficient into a color conversion equation stored in a second memory to obtain said pigment data Y, M and C.

* * * * *